(12) United States Patent
Mori et al.

(10) Patent No.: US 12,103,793 B2
(45) Date of Patent: Oct. 1, 2024

(54) UNLOADING APPARATUS, UNLOADING METHOD, AND PROGRAM

(71) Applicants: KABUSHIKI KAISHA TOSHIBA, Tokyo (JP); Toshiba Infrastructure Systems & Solutions Corporation, Kawasaki (JP)

(72) Inventors: Kazuhiro Mori, Yokohama (JP); Hiroshi Sukegawa, Yokohama (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 710 days.

(21) Appl. No.: 17/324,294

(22) Filed: May 19, 2021

(65) Prior Publication Data

US 2021/0269262 A1    Sep. 2, 2021

Related U.S. Application Data

(63) Continuation of application No. PCT/JP2019/045979, filed on Nov. 25, 2019.

(30) Foreign Application Priority Data

Nov. 29, 2018    (JP) ................................ 2018-223282

(51) Int. Cl.
  *B25J 9/16*    (2006.01)
  *B65G 61/00*   (2006.01)
  *B65G 65/00*   (2006.01)

(52) U.S. Cl.
  CPC ............ *B65G 61/00* (2013.01); *B25J 9/1612* (2013.01); *B25J 9/1697* (2013.01); *B65G 65/005* (2013.01); *B65G 2203/041* (2013.01)

(58) Field of Classification Search
  CPC .................. B65G 61/00; B65G 65/005; B65G 2203/041; B65G 2201/025;
  (Continued)

(56) References Cited

U.S. PATENT DOCUMENTS 8,538,579 B2 *  9/2013  Cottone ................. B65G 61/00
                                                      414/730
8,600,161 B2 * 12/2013  Simon .................. G06V 10/757
                                                      382/293
(Continued)

FOREIGN PATENT DOCUMENTS

JP    07-277512 A    10/1995
JP    2007-254128 A  10/2007
(Continued)

OTHER PUBLICATIONS

Extended European search report issued on Jul. 1, 2022 with corresponding EP Application No. 19889801.7; 10 pages.
(Continued)

*Primary Examiner* — Kira Nguyen
(74) *Attorney, Agent, or Firm* — Maier & Maier, PLLC

(57) ABSTRACT

An unloading apparatus comprises a sensor interface, a gripping unit interface and a processor. A sensor interface acquires a photographed image from a sensor that photographs an image of a cargo group. A processor transmits, in a case of successfully recognizing each piece of cargo of a same-type cargo group, a first control signal to the gripping unit to perform unloading according to a first gripping method corresponding to the same-type cargo group, and transmits, in a case of failing to recognize each piece of cargo of the same-type cargo group, a second control signal to the gripping unit to perform unloading according to a second gripping method corresponding to a mixed-type cargo group including different types of cargo.

5 Claims, 9 Drawing Sheets

(58) Field of Classification Search
CPC .......... B65G 2203/0233; B25J 9/1612; B25J 9/1697; B25J 9/026; B25J 9/1687; G05B 2219/40006
See application file for complete search history.

(56) References Cited

U.S. PATENT DOCUMENTS

| | | | |
|---|---|---|---|
| 9,327,406 B1 * | 5/2016 | Hinterstoisser | B25J 9/1697 |
| 10,011,439 B2 | 7/2018 | Sonoura et al. | |
| 10,053,305 B2 | 8/2018 | Eto et al. | |
| 10,095,943 B2 | 10/2018 | Yasunaga | |
| 10,410,172 B2 | 9/2019 | Sonoura et al. | |
| 10,569,957 B2 | 2/2020 | Nakamoto et al. | |
| 10,958,895 B1 * | 3/2021 | Krishnan Gorumkonda | H04N 13/246 |
| 2016/0347558 A1 | 12/2016 | Eto et al. | |
| 2017/0076469 A1 | 3/2017 | Sonoura et al. | |
| 2017/0137236 A1 | 5/2017 | Sonoura et al. | |
| 2017/0193319 A1 | 7/2017 | Yasunaga | |
| 2017/0246744 A1 | 8/2017 | Chitta et al. | |
| 2018/0144498 A1 | 5/2018 | Sugahara et al. | |

FOREIGN PATENT DOCUMENTS

| | | |
|---|---|---|
| JP | 2010-006510 A | 1/2010 |
| JP | 5263501 B2 | 8/2013 |
| JP | 2016-222377 A | 12/2016 |
| JP | 6052103 B2 | 12/2016 |
| JP | 2017-058130 A | 3/2017 |
| JP | 2017-088279 A | 5/2017 |
| JP | 2017-123163 A | 7/2017 |
| JP | 2018-043853 A | 3/2018 |
| JP | 2018-063238 A | 4/2018 |
| JP | 2018-081063 A | 5/2018 |

OTHER PUBLICATIONS

International Search Report issued Feb. 10, 2020 in PCT/JP2019/045979 filed on Nov. 25, 2019, 2 pages.

* cited by examiner

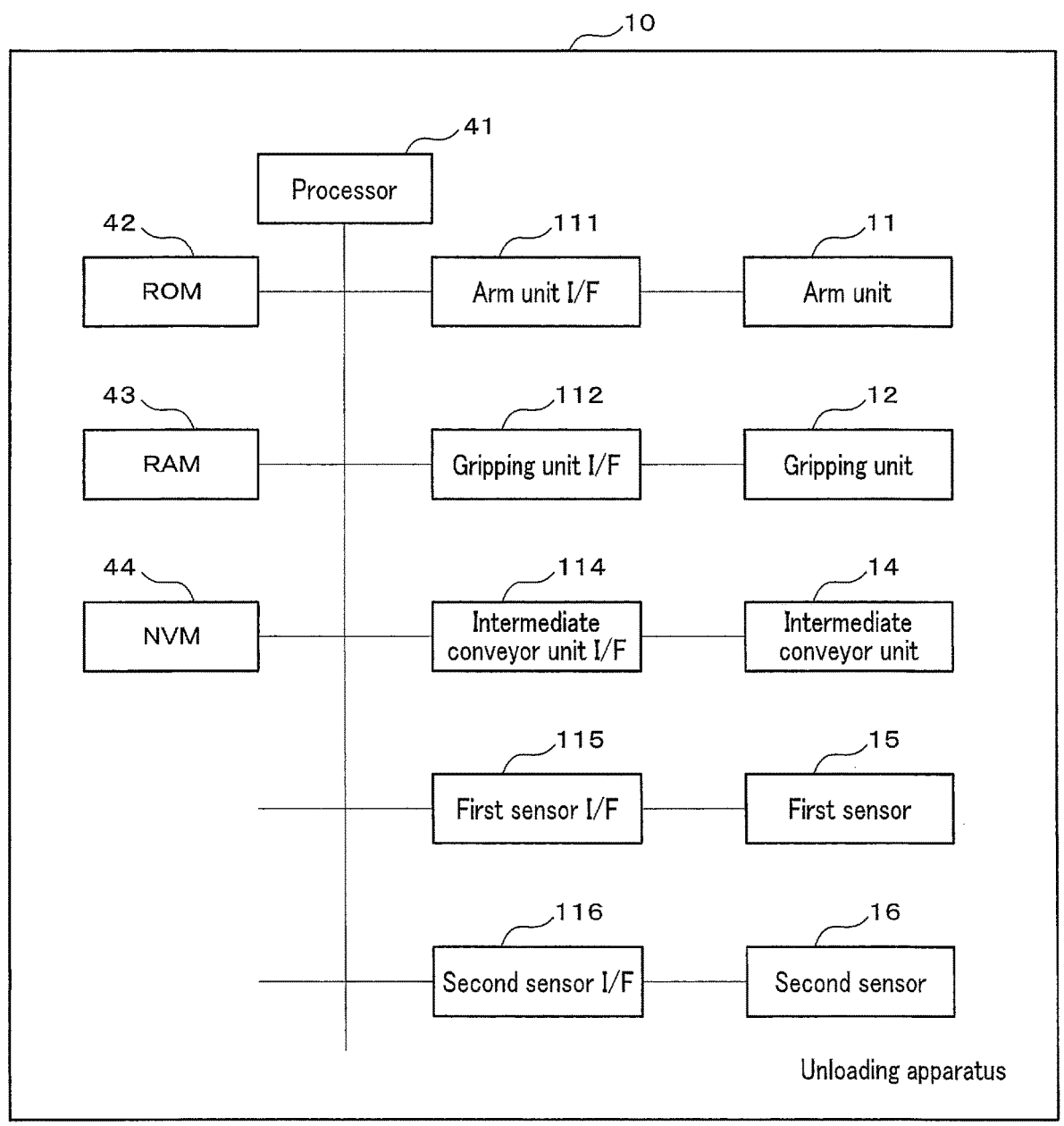
F I G. 2

UNLOADING APPARATUS, UNLOADING METHOD, AND PROGRAM

CROSS-REFERENCE TO RELATED APPLICATIONS

This application is a Continuation Application of PCT Application No. PCT/JP2019/045979, filed Nov. 25, 2019 and based upon and claiming the benefit of priority from Japanese Patent Application No. 2018-223282, filed Nov. 29, 2018, the entire contents of all of which are incorporated herein by reference.

FIELD

Embodiments described herein relate generally to an unloading apparatus, an unloading method, and a program.

BACKGROUND

Unloading apparatuses exist which unload cargo loaded on a pallet or the like. Such an unloading apparatus formulates a gripping plan by photographing an image of a same-type cargo group, in which the same kind of cargo is loaded with regularity, from above. The unloading apparatus unloads the same-type cargo group based on the gripping plan.

Conventionally, there has been a problem that an unloading apparatus is unable to unload a mixed-type cargo group loaded with different kinds of cargo.

CITATION LIST

PATENT LITERATURE 1: Jpn. Pat. Appln. KOKAI Publication No. 2018-43853

SUMMARY

In order to solve the problem described above, the present invention provides an unloading apparatus, an unloading method, and a program capable of effectively unloading a same-type cargo group and a mixed-type cargo group.

An unloading apparatus comprises a sensor interface, a gripping unit interface and a processor. A sensor interface acquires a photographed image from a sensor that photographs an image of a cargo group. A gripping unit interface communicates with a gripping unit configured to grip a piece of cargo of the cargo group. A processor recognizes, from the photographed image, each piece of cargo of a same-type cargo group including a same type of cargo, transmits, in a case of successfully recognizing each piece of cargo of the same-type cargo group, a first control signal to the gripping unit through the gripping unit interface to perform unloading according to a first gripping method corresponding to the same-type cargo group, and transmits, in a case of failing to recognize each piece of cargo of the same-type cargo group, a second control signal to the gripping unit through the gripping unit interface to perform unloading according to a second gripping method corresponding to a mixed-type cargo group including different types of cargo.

BRIEF DESCRIPTION OF THE DRAWINGS

FIG. 2 is a block diagram showing a configuration example of a control system of the unloading apparatus according to the embodiment.

DETAILED DESCRIPTION

Hereinafter, embodiments will be described with reference to the drawings.

An unloading apparatus according to an embodiment unloads a cargo group formed by loading a plurality of pieces of cargo. The unloading apparatus grips a piece of cargo from the cargo group and loads it onto an intermediate conveyor inside the apparatus. The unloading apparatus drives the intermediate conveyor on which the cargo is loaded and discharges the cargo to the outside. For example, the unloading apparatus discharges the cargo onto an external main conveyor.

Figure 1:
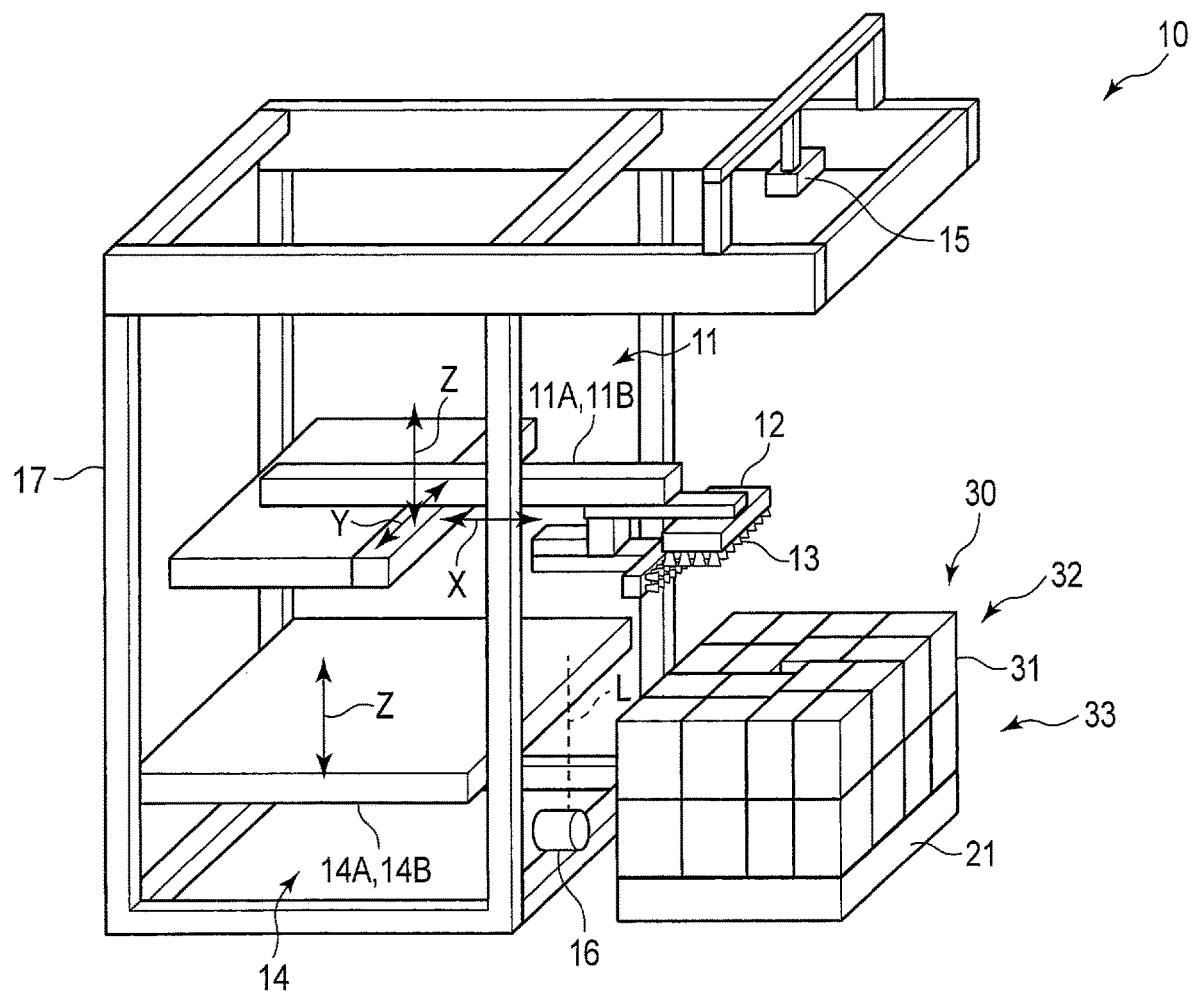
FIG. 1 is a diagram schematically showing a configuration example of an unloading apparatus according to an embodiment.

FIG. 1 is a diagram schematically showing a configuration example of an unloading apparatus 10. The unloading apparatus 10 includes an arm unit 11, a gripping unit 12, a suction pad 13, an intermediate conveyor unit 14, a first sensor 15, a second sensor 16, a housing 17, and the like.

The unloading apparatus 10 grips individual pieces of cargo 31 of a cargo group 30 loaded on a pallet 21 arranged near the unloading apparatus 10 and discharges them to the outside. For example, the unloading apparatus 10 discharges the piece of cargo 31 onto a main conveyor (not shown).

The cargo group 30 includes a plurality of pieces of cargo 31. The cargo group 30 is formed by stacking tiers each including a plurality of pieces of cargo 31. In the example shown in FIG. 1, the cargo group 30 includes a first tier 32 and a second tier 33.

The first tier 32 and the second tier 33 are configured by pieces of cargo arranged on the same plane. That is, the first tier 32 and the second tier 33 are configured by pieces of cargo arranged on the same plane without overlapping each other. The first tier 32 and the second tier 33 are same-type cargo groups or mixed-type cargo groups.

A same-type cargo group is a cargo group in which the same kind of cargo 31 is loaded with regularity. That is, the same-type cargo group is configured by the same kind of cargo 31. The same-type cargo group is a cargo group in which the same kind of cargo 31 is arranged on one surface with a predetermined surface on the upper surface. The upper surface of the same-type cargo group is a flat surface (having a constant height). The same-type cargo group may be configured by a plurality of pieces of cargo 31 arranged at a same angle. The same-type cargo group may also be configured by a plurality of pieces of cargo 31 arranged at angles different from each other.

A mixed-type cargo group is a cargo group in which different kinds of cargo 31 are loaded with regularity. That is, the mixed-type cargo group is configured by different kinds of cargo 31. The mixed-type cargo group is a cargo group in which different kinds of cargo 31 are arranged on one surface. The upper surface of the mixed-type cargo group may be a flat surface (having a constant height) or may not be a flat surface. The mixed-type cargo group may be configured by a plurality of pieces of cargo 31 arranged at a same angle. The mixed-type cargo group may also be configured by a plurality of pieces of cargo 31 arranged at angles different from each other.

The housing 17 is a frame forming an outer shape of the unloading apparatus 10.

The arm unit 11 is disposed in the middle part of the housing 17. The arm unit 11 is an orthogonal robot arm that linearly moves in three axial directions shown in FIG. 1, that is, an X-direction, a Y-direction (horizontal direction), and a Z-direction (height direction). The arm unit 11 includes an arm 11A and an arm-moving mechanism 11B.

The arm 11A is a member extending in the X-direction. The arm 11A is connected to the arm-moving mechanism 11B. The arm 11A is independently movable in the X-direction, the Y-direction, and the Z-direction by the arm-moving mechanism 11B.

The arm-moving mechanism 11B moves the arm 11A in the X-direction, the Y-direction, and the Z-direction, that is, in the horizontal direction and the height direction. The arm-moving mechanism 11B moves the arm 11A under the control of a processor 41 described later. For example, the arm-moving mechanism 11B includes an actuator that moves the arm 11A.

The gripping unit 12 is provided at the distal end of the arm 11A. The gripping unit 12 moves along with the movement of the arm unit 11 in the X-direction, the Y-direction, and the Z-direction. The arm unit 11 moves, for example, in the X direction to move the gripping unit 12 to a position where the gripping unit 12 grips the piece of cargo 31 of the cargo group 30.

The gripping unit 12 grips the piece of cargo 31 of the cargo group 30. Here, the gripping unit 12 includes the suction pad 13. The suction pad 13 suctions the piece of cargo 31. For example, the suction pad 13 suctions the piece of cargo 31 by vacuum suction. Based on the control from the processor 41, the suction pad 13 generates negative pressure inside. The suction pad 13 vacuum-suctions the surface of the piece of cargo 31 by generating negative pressure inside, in a state where it is in contact with the surface of the piece of cargo 31. When the negative pressure inside is released, the suction pad 13 releases the piece of cargo 31.

Here, the gripping unit 12 includes two suction pads 13. One suction pad 13 suctions the piece of cargo 31 from the Z-direction. The other suction pad 13 suctions the piece of cargo 31 from the X-direction. The number of the suction pads 13 may be one or three or more.

It should be noted that various gripping mechanisms other than the suction pad may be adopted as the gripping unit 12. For example, the gripping unit 12 may include a gripper that grips the piece of cargo 31. The gripper includes a plurality of fingers and a plurality of joint mechanisms connecting the plurality of fingers. The joint mechanism may be configured to move the finger in conjunction with the movement of the joint mechanism. For example, the gripper applies forces to the cargo from a plurality of opposing directions at two or more contact points with a plurality of fingers. Thus, the gripping unit 12 grips the cargo by friction generated between the fingers and the cargo. The configuration of the gripping unit 12 may use various gripping mechanisms capable of gripping the piece of cargo 31 of the cargo group 30, and is not limited to a specific configuration.

The intermediate conveyor unit 14 is disposed below the arm unit 11 in the housing 17. The intermediate conveyor unit 14 loads the piece of cargo 31 released by the gripping unit 12 and discharges the piece of cargo 31 to the outside (for example, a main conveyor).

The intermediate conveyor unit 14 includes an intermediate conveyor 14A and an intermediate conveyor raising/lowering mechanism 14B.

The intermediate conveyor 14A is arranged inside the housing 17 of the unloading apparatus 10. The intermediate conveyor 14A is formed at a position for receiving the piece of cargo 31 gripped by the gripping unit 12 and moved in the X-direction (horizontal direction in FIG. 1) by the arm unit 11. The intermediate conveyor 14A loads the piece of cargo 31 released by the gripping unit 12.

The intermediate conveyor 14A is driven under the control of the processor 41. The intermediate conveyor 14A discharges the piece of cargo 31 released by the gripping unit 12 to the outside.

For example, the intermediate conveyor 14A is a roller conveyor or the like.

The intermediate conveyor raising/lowering mechanism 14B moves (raises/lowers) the intermediate conveyor 14A in the Z-direction, that is, in the height direction, under the control of the processor 41. The intermediate conveyor raising/lowering mechanism 14B raises/lowers the intermediate conveyor 14A so that the height of the bottom surface of the piece of cargo 31 gripped by the gripping unit 12 and the height of the loading surface of the intermediate conveyor 14A are substantially the same.

The first sensor 15 is arranged in the housing 17 above the position where the cargo group 30 of the pallet 21 is disposed. The first sensor 15 photographs the cargo group 30 of the pallet 21 and acquires the photographed image. The first sensor 15 acquires an RGB color image for the photographed image.

The first sensor 15 also measures a distance from each part on the pallet 21 to the first sensor 15 or a distance from each part on the pallet 21 to a surface horizontal to the first sensor 15.

The first sensor 15 generates distance information indicating a distance from a predetermined reference surface based on the measurement result. For example, the distance information may indicate coordinates of each point in a predetermined three dimensional coordinate system.

For example, the first sensor 15 is a stereo camera. The stereo camera measures the distance between the first sensor 15 and each part on the pallet 21 based on parallax when images are captured from two different points.

For example, the first sensor 15 may also include a light source and an optical sensor that detects reflected light of light emitted from the light source. The first sensor 15 measures the distance based on the reflected light of light (visible light or invisible light) emitted from the light source. For example, the first sensor 15 may perform a time-of-flight (ToF) method of measuring the distance to a measurement target based on the time taken for the emitted light to reach the optical sensor after being reflected by the measurement target. In this case, in addition to the first sensor 15, the unloading apparatus 10 may use a sensor that separately acquires an RGB color image in combination. Furthermore, a plurality of first sensors 15 may be arranged and used in combination.

The second sensor 16 is disposed between the cargo group 30 regularly stacked on the pallet 21 and the intermediate conveyor unit 14 in the X-direction. For example, the second sensor 16 is installed on the bottom frame of the housing 17.

The second sensor 16 measures a distance from the second sensor 16 to the piece of cargo 31 gripped by the gripping unit 12 and moved to the intermediate conveyor 14A by the arm unit 11. That is, the second sensor 16 measures the distance from the second sensor 16 to the bottom surface of the piece of cargo 31.

For example, the second sensor 16 includes a light source and an optical sensor that detects reflected light of light emitted from the light source. The second sensor 16 measures the distance based on reflected light of light (visible light or invisible light) emitted from the light source. For example, the second sensor 16 may perform a time-of-flight (ToF) method of measuring the distance to a measurement target based on the time taken for the emitted light to reach the optical sensor after being reflected by the measurement target.

FIG. 2 is a block diagram showing a configuration example of the unloading apparatus 10. The unloading apparatus 10 includes the arm unit 11, the gripping unit 12, the intermediate conveyor unit 14, the first sensor 15, the second sensor 16, the processor 41, a ROM 42, a RAM 43, an NVM 44, an arm unit interface 111, a gripping unit interface 112, an intermediate conveyor unit interface 114, a first sensor interface 115, a second sensor interface 116, and the like.

The processor 41 and the ROM 42, the RAM 43, the NVM 44, the arm unit interface 111, the gripping unit interface 112, the intermediate conveyor unit interface 114, the first sensor interface 115, and the second sensor interface 116 are connected to each other. The arm unit interface 111 is connected to the arm unit 11. The gripping unit interface 112 is connected to the gripping unit 12. The intermediate conveyor unit interface 114 is connected to the intermediate conveyor unit 14. The first sensor interface 115 is connected to the first sensor 15. The second sensor interface 116 connects with the second sensor 16.

The processor 41 controls the operation of the entire unloading apparatus 10. The processor 41 may include an internal cache and various interfaces. The processor 41 realizes various kinds of processing by executing a program stored in advance in the internal cache, the ROM 42, or the NVM 44.

It should be noted that some of the various functions realized by the processor 41 executing the program may be realized by a hardware circuit. In this case, the processor 41 controls the functions performed by the hardware circuit.

The ROM 42 is a non-volatile memory in which a control program and control data, etc. are stored in advance. The control program and control data stored in the ROM 42 are pre-installed according to the specifications of the unloading apparatus 10. The ROM 42 stores, for example, a program for controlling a circuit board of the unloading apparatus 10.

The RAM 43 is a volatile memory. The RAM 43 temporarily stores data, etc. being processed by the processor 41. The RAM 43 stores various application programs based on instructions from the processor 41. The RAM 43 may store data necessary for executing the application program and the result of executing the application program, etc.

The NVM 44 is a data-writable and rewritable nonvolatile memory. The NVM 44 includes, for example, a hard disk drive (HDD), a solid state drive (SDD), or a flash memory. The NVM 44 stores a control program, an application, various kinds of data, and the like according to the operational use of the unloading apparatus 10.

The arm unit interface 111 is an interface for communicating with the arm unit 11. For example, the arm unit interface 111 transmits a signal for moving the arm 11A in the X-direction under the control of the processor 41. In addition, the arm unit interface 111 may supply power to the arm unit 11.

The gripping unit interface 112 is an interface for communicating with the gripping unit 12. For example, the gripping unit interface 112 transmits a signal for causing the suction pad 13 of the gripping unit 12 to suction the piece of cargo 31 or release the piece of cargo 31 under the control of the processor 41. In addition, the gripping unit interface 112 may supply power to the gripping unit 12.

The intermediate conveyor unit interface 114 is an interface for communicating with the intermediate conveyor unit 14. For example, the intermediate conveyor unit interface 114 transmits a signal for driving the intermediate conveyor 14A under the control of the processor 41. In addition, the intermediate conveyor unit interface 114 transmits a signal for raising/lowering the intermediate conveyor 14A under the control of the processor 41. The intermediate conveyor unit interface 114 may also supply power to the intermediate conveyor unit 14.

The first sensor interface 115 is an interface for communicating with the first sensor 15. For example, the first sensor interface 115 transmits a signal requesting a photographed image or distance information under the control of the processor 41. In addition, the first sensor interface 115 transmits the photographed image or the distance information from the first sensor 15 to the processor 41. The first sensor interface 115 may also supply power to the first sensor 15.

The second sensor interface 116 is an interface for communicating with the second sensor 16. For example, the second sensor interface 116 transmits a signal for measuring the distance under the control of the processor 41. In addition, the second sensor interface 116 transmits information indicating the distance from the second sensor 16 to the processor 41. The second sensor interface 116 may also supply power to the second sensor 16.

The arm unit interface 111, the gripping unit interface 112, the intermediate conveyor unit interface 114, the first sensor interface 115, and the second sensor interface 116 may be integrally formed.

Also, the unloading apparatus 10 may include other components as needed in addition to those shown in FIGS. 1 and 2, or may have certain components excluded therefrom.

Functions realized by the unloading apparatus 10 will now be described. The function realized by the unloading apparatus 10 is realized by the processor 41 executing a program stored in the ROM 42 or the NVM 44.

First, the processor 41 has a function of acquiring a photographed image and distance information of the cargo group 30 using the first sensor 15.

Here, it is assumed that the cargo group 30 is loaded on the pallet 21.

For example, when the processor 41 detects that the pallet 21 on which the cargo group 30 is loaded is arranged in a predetermined region, the processor 41 transmits a signal requesting the photographed image and the distance information to the first sensor 15 through the first sensor interface 115.

When the first sensor 15 receives the sensor, the first sensor 15 photographs the cargo group 30 and acquires the photographed image. The first sensor 15 also measures the distance to each part on the pallet 21 and generates distance information. The first sensor 15 transmits the photographed image and the distance information to the processor 41 through the first sensor interface 115.

The processor 41 acquires the photographed image and the distance information from the first sensor 15.

It should be noted that the processor 41 may transmit a signal requesting the photographed image and the distance information to the first sensor 15 when receiving an input of a predetermined operation from an operator.

In addition, the processor 41 has a function of recognizing each piece of cargo 31 of the same-type cargo group based on the photographed image and the distance information. That is, the processor 41 specifies a cargo region in which each piece of cargo of the same-type cargo group appears.

Figure 3:
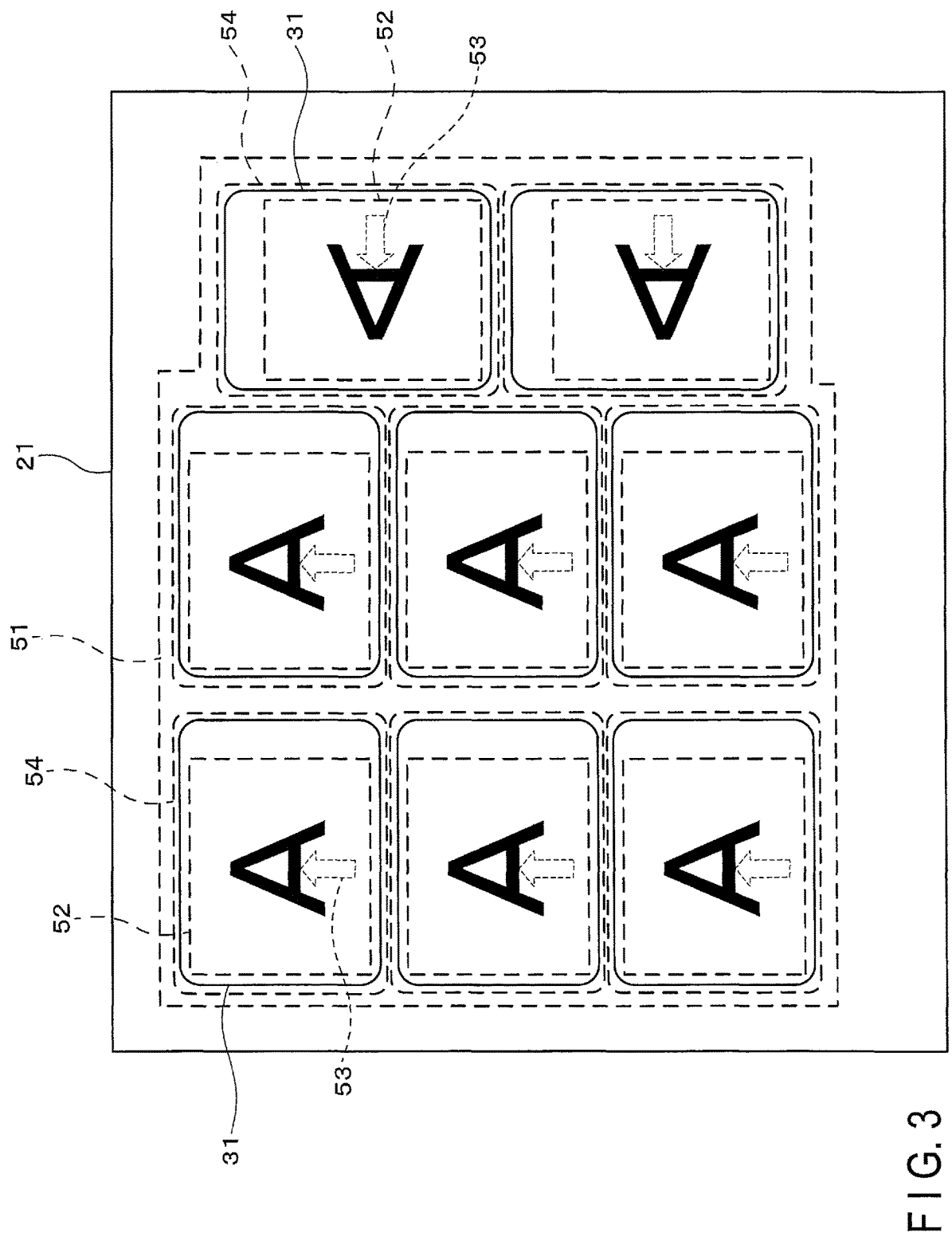
FIG. 3 is a diagram for explaining an operation example of the unloading apparatus according to the embodiment.

Here, it is assumed that the upper tier of the cargo 31 loaded on the pallet 21 forms the same-type cargo group. FIG. 3 shows an example of a photographed image obtained by photographing the same-type cargo group.

As shown in FIG. 3, a plurality of pieces of cargo 31 are loaded on one surface of the pallet 21. The plurality of pieces of cargo 31 are of the same type. Here, it is assumed that eight pieces of cargo 31 are loaded on the pallet 21.

First, the processor 41 extracts a cargo group region included in the same-type cargo group from the photographed image based on the distance information. The cargo group region is a region in which the upper surfaces of the plurality of pieces of cargo 31 can be seen.

For example, the processor 41 can collectively extract distance information indicating a predetermined distance as the cargo group region based on each point indicated by the distance information. Alternatively, a plane region may be extracted as the cargo group region. In this case, the processor 41 defines a plurality of virtual planes and obtains the distance between the virtual planes and point groups. The processor 41 uses a method of excluding points with distances equal to or greater than a predetermined threshold value and finding a virtual plane of which a difference from the remaining point group is minimum, and estimates a plane that is represented by the point group. The processor 41 specifies the upper surface of the cargo group from the virtual plane by extracting the virtual plane at a height equal to or higher than a predetermined threshold value (for example, a value based on the height of the piece of cargo 31 or the like).

By calibration of the photographed image and the distance information, the processor 41 extracts a region corresponding to the upper surface of the cargo group specified based on the distance information from the photographed image. The processor 41 acquires the extracted region as the cargo group region.

In the example shown in FIG. 3, the processor 41 extracts a cargo group region 51 from the photographed image. As shown in FIG. 3, the cargo group region 51 is a region including each piece of the cargo 31.

In a case where the cargo group region cannot be extracted, the processor 41 determines that the recognition of the cargo region has failed.

After extracting the cargo group region 51, the processor 41 specifies a reference region and the direction of each piece of cargo 31. The reference region is a region in which a reference image that is a partial image of the piece of cargo 31 or an image having the same pattern as the reference image exists. The direction is an angle of the piece of cargo 31 (for example, an angle of the reference image).

For example, the processor 41 sets an image of a predetermined region in the cargo group region (partial image of the piece of cargo 31) as the reference image. When the reference image is set, the processor 41 scans the cargo group region to extract a region having the same pattern as the reference image as a reference region. In addition, the processor 41 specifies the direction of the reference region.

It should be noted that the processor 41 may perform scanning while changing one or both of the size of the reference image and the size of the image in the cargo group region. In this case, the processor 41 can detect the reference region even if the state of the piece of cargo 31 changes.

The method by which the processor 41 specifies the reference region and the direction can also be realized by pattern matching using a correlation value between the region of the reference image and the region to be matched or a sum of absolute values (SAD) of differences in pixel values. The method by which the processor 41 specifies the reference region and the direction can be realized by either a method of rotating the direction of the reference image in order to obtain directionality or a method of rotating the region to be matched. As a matching method, any method can be applied as long as it is a method using a local feature amount or a method of comparing patterns using statistics of colors or edges. In addition, the processor 41 may combine results of not only one instance of matching processing but also a plurality of instances of matching processing.

In the example shown in FIG. 3, the processor 41 extracts a reference region 52. Here, the processor 41 extracts the reference region 52 by using the upper left region of the image of the piece of cargo 31 as the reference image. The size of the reference image may be determined in accordance with the size of the expected piece of cargo. Alternatively, the processor 41 may perform a plurality of instances of matching processing by setting a plurality of sizes. Furthermore, the processor 41 specifies an arrow 53 as the angle of the reference region 52. The arrow 53 indicates the angle of the reference region 52. The arrows 53 are respectively set in the reference regions 52.

In the case where the processor 41 cannot extract a region having the same pattern as the reference image, the processor 41 determines that the recognition of the cargo region has failed.

When the reference region and the direction are specified, the processor 41 extracts a cargo region in which one piece of cargo 31 appears based on the reference region, the direction, and the like.

For example, the processor 41 estimates the shape of the piece of cargo 31 with reference to the reference region and estimates the boundary of the piece of cargo 31. The processor 41 sets the same rectangle (rectangle or square) as the outer shape of the reference region, and changes the size of the rectangle. Here, since the reference image is smaller than the piece of cargo 31, the processor 41 enlarges the size of the rectangle in the vertical and horizontal directions in order to estimate the cargo region.

The processor 41 enlarges the size of the rectangle, and selects a rectangular region that best fits the cargo group region as the cargo region. For example, the processor 41 selects a rectangular region that best fits with reference to the fact that the overlap between the cargo regions is small, the fact that the region without the cargo region is small with respect to the cargo group region, and the fact that the amount of the cargo region protruding into the cargo group region is small. In order to balance each item, the processor 41 may multiply each index indicating each item by a predetermined coefficient, add the products, and select a rectangular region that best fits. The processor 41 may perform multiplication or division on each index.

It should be noted that, in a case where there is no rectangular region that best fits (for example, in a case where an index indicating the fit does not exceed the threshold value), the processor 41 may determine that the recognition of the cargo region has failed.

In addition, in a case where there is no rectangular region that best fits, the processor 41 may reduce the failure of recognition by performing recognition by changing the parameter or the like again, or by performing the processing of estimating the size of the rectangle again only at a position where the piece of cargo 31 does not exist.

In the example shown in FIG. 3, the processor 41 extracts the cargo region 54. As shown in FIG. 3, the processor 41 extracts a cargo region 54 for each piece of cargo 31.

The processor 41 also has a function of generating shape information indicating a 3D cargo region corresponding to the cargo region in the three dimensional space.

The processor 41 generates shape information indicating a 3D cargo region corresponding to the cargo region by calibration between the photographed image and the distance information.

The processor 41 also has a function of transmitting, to the gripping unit 12, a first control signal for unloading the piece of cargo 31 according to a gripping method (first gripping method) for gripping the piece of cargo 31 from the same-type cargo group based on the shape information.

The processor 41 formulates a gripping plan based on the shape information. The gripping plan indicates a position (gripping position) and an order in which the gripping unit 12 grips the piece of cargo 31.

For example, the gripping plan indicates, as the gripping position, the center portion of the edge facing the cargo region in a direction (the X-direction) from the gripping unit 12 to the piece of cargo 31. That is, the gripping plan indicates the center portion of the edge of the cargo region viewed from the gripping unit 12 side as the gripping position. In a case where the gripping unit 12 grips the piece of cargo 31 from the Z-direction, the gripping plan may indicate the center portion of the cargo region as the gripping position.

In addition, the gripping plan may indicate that, as the order of gripping, the pieces of cargo 31 are sequentially gripped one by one. In addition, the gripping plan may indicate that a plurality of pieces of cargo 31 are simultaneously gripped.

The processor 41 grips the piece of cargo 31 according to the gripping plan and discharges the piece of cargo 31 to the outside. That is, the processor 41 transmits the first control signal to the gripping unit 12 based on the gripping plan.

For example, the processor 41 moves the gripping unit 12 to the gripping position using the arm unit 11. When the gripping unit 12 is moved to the gripping position, the processor 41 suctions the piece of cargo 31 using the suction pad 13 of the gripping unit 12.

When the piece of cargo 31 is suctioned, the processor 41 moves the piece of cargo 31 to the intermediate conveyor 14A of the intermediate conveyor unit 14 by using the arm unit 11.

During this time, the processor 41 measures the distance to the bottom surface of the piece of cargo 31 using the second sensor 16. The processor 41 calculates the height of the piece of cargo 31 based on the measured distance. For example, the processor 41 calculates the height of the piece of cargo 31 based on the height of the gripping unit 12 and the measured distance.

When the height of the piece of cargo 31 is calculated, the processor 41 raises/lowers the intermediate conveyor 14A based on the height of the piece of cargo 31 using the intermediate conveyor raising/lowering mechanism 14B. That is, the processor 41 raises/lowers the intermediate conveyor 14A such that the height of the bottom surface of the piece of cargo 31 gripped by the gripping unit 12 is substantially the same as the height of the loading surface of the intermediate conveyor 14A. The processor 41 raises/lowers the intermediate conveyor 14A when gripping the first piece of cargo 31 from the same-type cargo group.

When the piece of cargo 31 is moved to the intermediate conveyor 14A of the intermediate conveyor unit 14, the processor 41 releases the suction pad 13 and loads the piece of cargo 31 on the intermediate conveyor 14A. When the piece of cargo 31 is loaded on the intermediate conveyor 14A, the processor 41 uses the arm unit 11 to retract the gripping unit 12 to a position where the gripping unit 12 does not collide with the piece of cargo 31 and the intermediate conveyor 14A.

When the gripping unit 12 is retracted, the processor 41 raises/lowers the intermediate conveyor 14A to a predetermined height (a discharge position). For example, the processor 41 raises/lowers the intermediate conveyor 14A so as to become the same height as the height of the main conveyor that is the discharge destination. After the intermediate conveyor 14A is raised/lowered, the processor 41 drives the intermediate conveyor 14A to discharge the piece of cargo 31 to the outside.

The processor 41 repeats the above operation in accordance with the gripping plan to discharge each piece of cargo 31 to the outside.

In addition, in the case of failing to specify the cargo region of the piece of cargo 31 of the same-type cargo group, the processor 41 has a function of transmitting, to the gripping unit 12, a second control signal for unloading the piece of cargo 31 according to a gripping method (a second gripping method) for gripping the piece of cargo 31 of the mixed-type cargo group.

Figure 4:
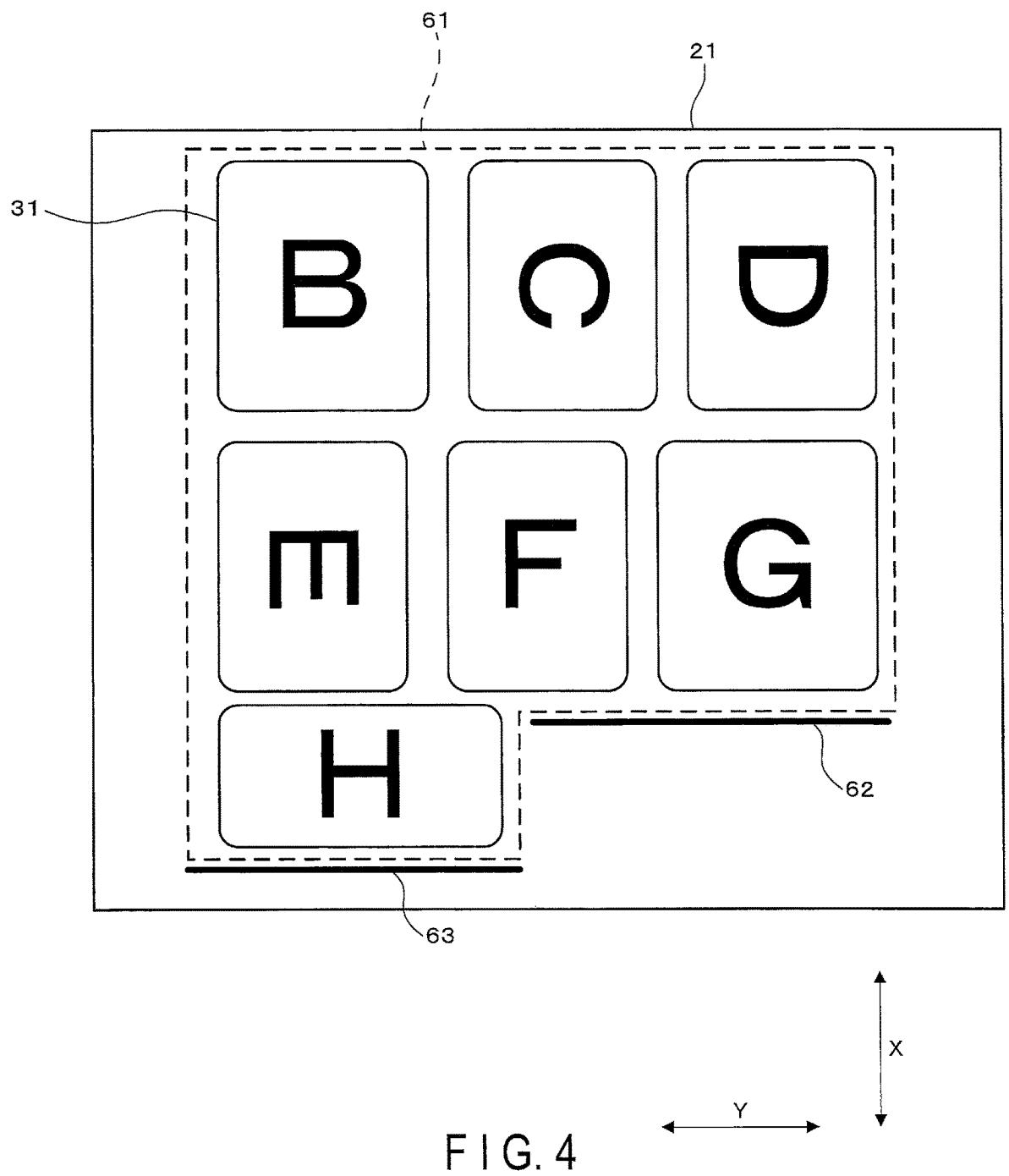
FIG. 4 is a diagram for explaining an operation example of the unloading apparatus according to the embodiment.

Here, it is assumed that the upper tier of the piece of cargo 31 loaded on the pallet 21 forms a mixed-type cargo group. FIG. 4 shows an example of a photographed image obtained by photographing the mixed-type cargo group.

As shown in FIG. 4, a plurality of pieces of cargo 31 are loaded on one surface of the pallet 21. The plurality of pieces of cargo 31 are pieces of cargo of different types. Here, it is assumed that seven pieces of cargo 31 are loaded on the pallet 21.

In the case where it is determined that recognition of the cargo region of the piece of cargo 31 of the same-type cargo group has failed, the processor 41 acquires the photographed image and the distance information of the cargo group 30 using the first sensor 15. The operation example of acquiring the photographed image and the distance information is as described above.

When the photographed image and the distance information are acquired, the processor 41 extracts a cargo group region based on the photographed image and the distance information. The operation example of extracting the cargo group region is as described above.

In the example shown in FIG. 4, the processor 41 extracts a cargo group region 61.

When the cargo group region is extracted, the processor 41 determines the gripping position based on the cargo group region.

First, the processor 41 extracts an edge (a candidate edge) facing the gripping unit 12 in the direction from the gripping unit 12 to the piece of cargo 31 (that is, the X-direction) from the outer frame of the cargo group region. For example, the processor 41 can extract the candidate edge by obtaining the contour of the cargo group region and obtaining the normal direction of the contour to extract a contour portion facing the gripping unit 12 side.

In the example shown in FIG. 4, it is assumed that the gripping unit 12 is located on the lower side. As shown in FIG. 4, the processor 41 extracts a candidate edge 62 and a candidate edge 63. The candidate edges 62 and 63 are lower edges in the X direction.

When the candidate edge is extracted, the processor 41 determines a gripping position on the candidate edge. For example, the processor 41 assumes that a predetermined piece of cargo (for example, the smallest piece of cargo that would be expected) is in contact with the candidate edge at the end of the candidate edge. The processor 41 determines the gripping position based on the width of the predetermined piece of cargo. For example, the processor 41 determines a position away from the end of the candidate edge by a predetermined distance (for example, half the width of the predetermined piece of cargo) as the gripping position.

In a case where the gripping unit 12 grips the piece of cargo 31 from the upper surface, the processor 41 may set the gripping position in the cargo group region. For example, the processor 41 assumes that a predetermined piece of cargo (for example, the smallest piece of cargo that would be expected) is arranged at a corner of the cargo group region. The processor 41 determines the center (for example, the center of gravity) of the predetermined piece of cargo as the gripping position.

The method by which the processor 41 determines the gripping position is not limited to a specific method.

When the gripping position is determined, the processor 41 grips the piece of cargo 31 based on the gripping position and discharges the piece of cargo 31 to the outside. That is, the processor 41 transmits the second control signal to the gripping unit 12 based on the gripping position.

For example, the processor 41 moves the gripping unit 12 to the gripping position using the arm unit 11. When the gripping unit 12 is moved to the gripping position, the processor 41 suctions the piece of cargo 31 using the suction pad 13 of the gripping unit 12.

When the piece of cargo 31 is suctioned, the processor 41 moves the piece of cargo 31 to the intermediate conveyor 14A of the intermediate conveyor unit 14 by using the arm unit 11.

During this time, the processor 41 measures the distance to the bottom surface of the piece of cargo 31 using the second sensor 16. The processor 41 calculates the height of the piece of cargo 31 based on the measured distance. For example, the processor 41 calculates the height of the piece of cargo 31 based on the height of the gripping unit 12 and the measured distance.

When the height of the piece of cargo 31 is calculated, the processor 41 raises/lowers the intermediate conveyor 14A based on the height of the piece of cargo 31 using the intermediate conveyor raising/lowering mechanism 14B. That is, the processor 41 raises/lowers the intermediate conveyor 14A such that the height of the bottom surface of the piece of cargo 31 gripped by the gripping unit 12 is substantially the same as the height of the loading surface of the intermediate conveyor 14A. The processor 41 may raise/lower the intermediate conveyor 14A when gripping the first piece of cargo 31 from the mixed-type cargo group.

When the piece of cargo 31 is moved to the intermediate conveyor 14A of the intermediate conveyor unit 14, the processor 41 releases the suction pad 13 and loads the piece of cargo 31 on the intermediate conveyor 14A. When the piece of cargo 31 is loaded on the intermediate conveyor 14A, the processor 41 uses the arm unit 11 to retract the gripping unit 12 to a position where the gripping unit 12 does not collide with the piece of cargo 31 and the intermediate conveyor 14A.

When the gripping unit 12 is retracted, the processor 41 raises/lowers the intermediate conveyor 14A to a discharge position. For example, the processor 41 raises/lowers the intermediate conveyor 14A so as to become the same height as the height of the main conveyor that is the discharge destination. After the intermediate conveyor 14A is raised/lowered, the processor 41 drives the intermediate conveyor 14A to discharge the piece of cargo 31 to the outside.

The processor 41 repeats the above operation to discharge each piece of cargo 31 to the outside.

Even in a case where the same-type cargo group is successfully recognized, in a case where the number of recognized pieces of cargo is smaller than the predetermined threshold value, the processor 41 grips the piece of cargo 31 by the second gripping method. With this operation, in the case where the processor 41 recognizes a plurality of pieces of cargo 31 as one piece of cargo when recognizing the same-type cargo group, the processor 41 can grip the piece of cargo 31 by the second gripping method.

The second gripping method is a method that is slower than the first gripping method. For example, the first gripping method may grip a plurality of pieces of cargo 31 simultaneously, while the second gripping method grips pieces of cargo 31 one by one. The speed at which the piece of cargo 31 is moved in the first gripping method may be higher than that in the second gripping method.

Next, an operation example of the unloading apparatus 10 will be described.

Figure 5:
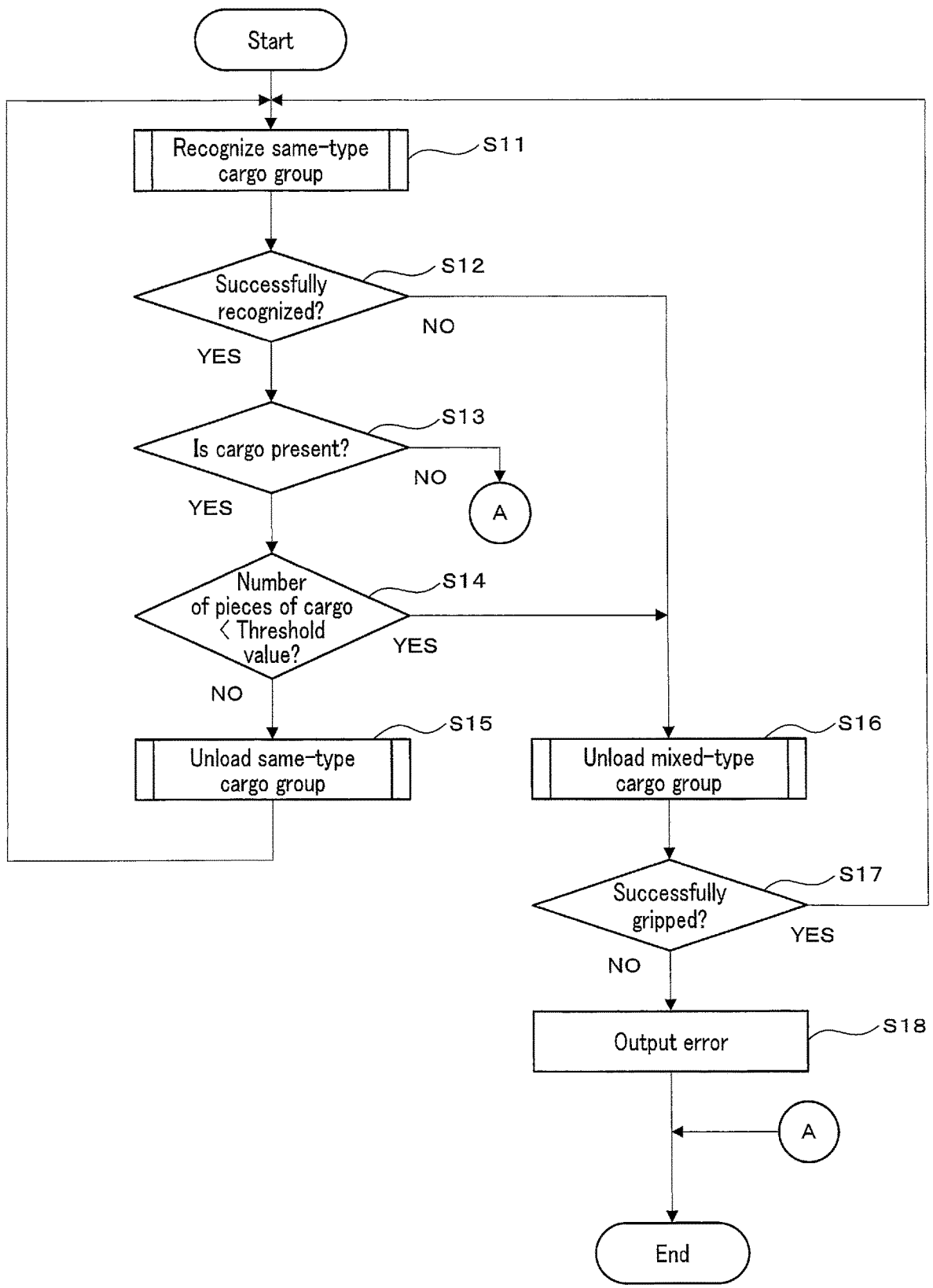
FIG. 5 is a flowchart for explaining an operation example of the unloading apparatus according to the embodiment.

FIG. 5 is a flowchart for explaining the operation example of the unloading apparatus 10.

First, the processor 41 of the unloading apparatus 10 recognizes the upper tier of the cargo group 30 as the same-type cargo group (S11).

When it is determined that the recognition is successful (S12, YES), the processor 41 determines whether the piece of cargo 31 is on the pallet 21 (S13). When it is determined that the piece of cargo 31 is on the pallet 21 (S13, YES), the processor 41 determines whether the number of recognized pieces of cargo 31 is smaller than the threshold value (S14).

When it is determined that the number of recognized pieces of cargo 31 is equal to or greater than the threshold value (S14, NO), the processor 41 performs unloading of the upper tier according to the first gripping method of gripping pieces of cargo 31 of the same-type cargo group (S15). When the unloading of the upper tier is performed according to the first gripping method of gripping the piece of cargo 31 from the same-type cargo group, the processor 41 returns to S11.

In the case where it is determined that the recognition has failed (S12, NO), or in the case where it is determined that the number of recognized pieces of cargo is smaller than the threshold value (S14, NO), the processor 41 unloads the upper tier according to the second gripping method of gripping the piece of cargo 31 from the mixed-type cargo group (S16).

If the unloading is successful (S17, YES), the processor 41 returns to S11.

If the unloading has failed (S17, NO), the processor 41 outputs an error indicating that the unloading has failed (S18).

In a case where it is determined that the piece of cargo 31 is not on the pallet 21 (the piece of cargo 31 has been gripped) (S13, NO), or in a case where an error indicating that the unloading has failed is output (S18), the processor 41 ends the operation.

An operation example (S11) in which the processor 41 recognizes the upper tier of the cargo group 30 as the same-type cargo group will now be described.

Figure 6:
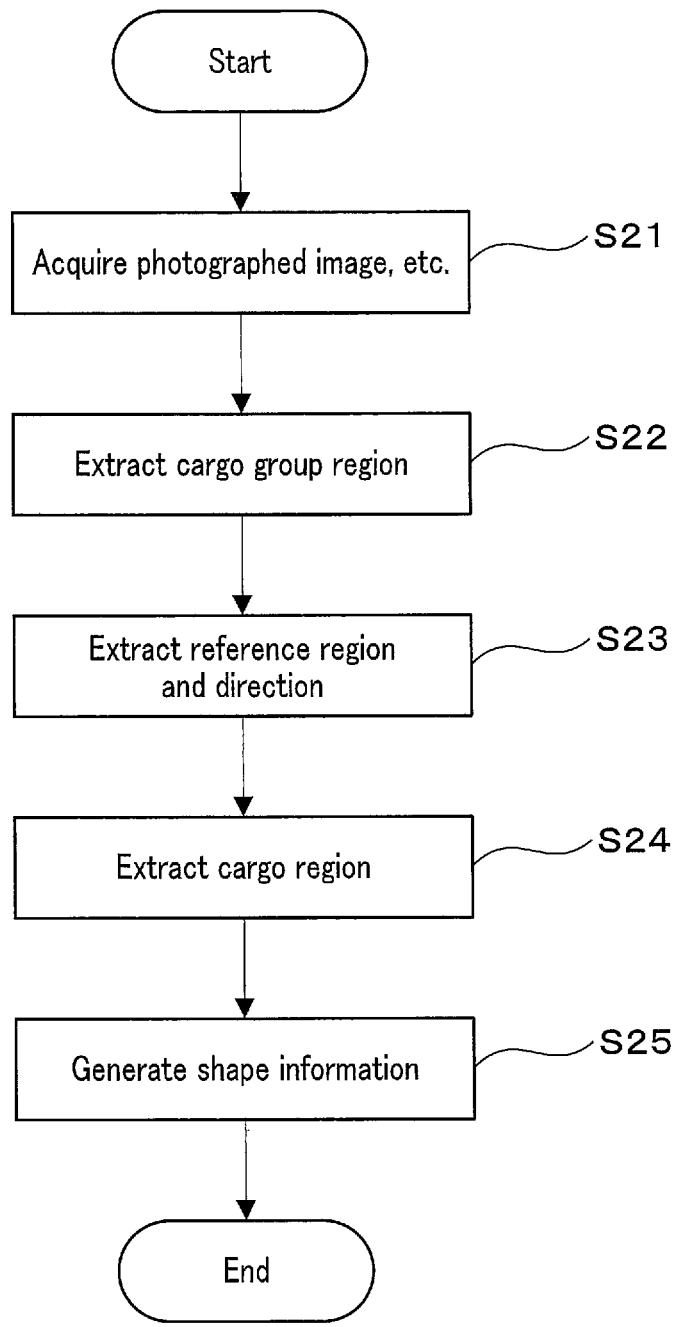
FIG. 6 is a flowchart for explaining an operation example of the unloading apparatus according to the embodiment.

FIG. 6 is a flowchart for explaining the operation example (S11) in which the processor 41 recognizes the upper tier of the cargo group 30 as the same-type cargo group.

First, the processor 41 acquires a photographed image and distance information using the first sensor 15 (S21). After acquiring the photographed image and the distance information, the processor 41 extracts a cargo group region from the photographed image (S22).

After extracting the cargo group region, the processor 41 extracts a reference region and a direction (S23). After extracting the reference region and the direction, the processor 41 extracts each cargo region (S24).

After extracting each cargo region, the processor 41 generates shape information indicating each 3D cargo region corresponding to each cargo region (S25). After generating the shape information, the processor 41 ends the operation.

An operation example (S15) in which the processor 41 unloads the upper tier according to the first gripping method of gripping the piece of cargo 31 from the same-type cargo group will now be described.

Figure 7:
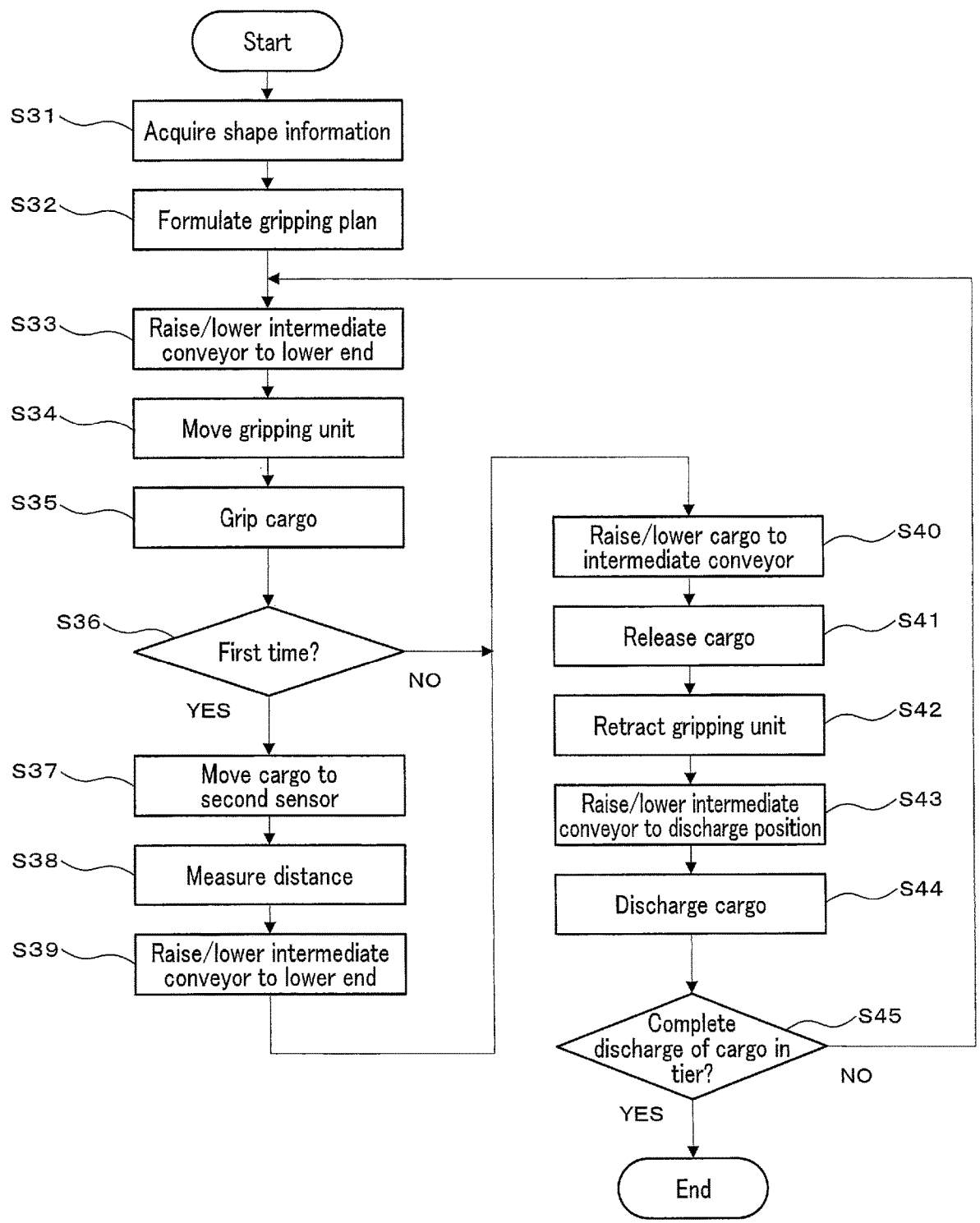
FIG. 7 is a flowchart for explaining an operation example of the unloading apparatus according to the embodiment.

FIG. 7 is a flowchart for explaining the operation example (S15) in which the processor 41 unloads the upper tier according to the first gripping method of gripping the piece of cargo 31 from the same-type cargo group.

First, the processor 41 acquires the shape information (S31). When the shape information is acquired, the processor 41 formulates a gripping plan based on the shape information (S32). When the gripping plan is formulated, the processor 41 raises/lowers the intermediate conveyor 14A to the lower end of the piece of cargo 31 (S33).

When the intermediate conveyor 14A is raised/lowered to the lower end of the piece of cargo 31, the processor 41 moves the gripping unit 12 to the piece of cargo 31 (S34). After moving the gripping unit 12 to the piece of cargo 31, the processor 41 grips the piece of cargo 31 (S35).

When the piece of cargo 31 is gripped, the processor 41 determines whether the first piece of cargo 31 is gripped from the same-type cargo group (S36). When it is determined that the first piece of cargo 31 is gripped from the same-type cargo group (S36, YES), the processor 41 moves the piece of cargo 31 to a position above the second sensor 16 (S37).

When the piece of cargo 31 is moved to a position above the second sensor 16, the processor 41 measures the distance to the bottom surface of the piece of cargo 31 using the second sensor 16 (S38). After measuring the distance to the bottom surface of the piece of cargo 31, the processor 41 raises/lowers the intermediate conveyor 14A to the lower end of the piece of cargo 31 based on the distance (S39).

In a case where it is determined that the second or subsequent piece of cargo 31 is gripped from the same-type cargo group (S36, NO), and in a case where the intermediate conveyor 14A is raised/lowered to the lower end of the piece of cargo 31 based on the distance (S39), the processor 41 moves the piece of cargo 31 onto the intermediate conveyor 14A (S40).

When the piece of cargo 31 is moved onto the intermediate conveyor 14A, the processor 41 releases the piece of cargo 31 (S41). When the piece of cargo 31 is released, the processor 41 retracts the gripping unit 12 (S42).

When the gripping unit 12 is retracted, the processor 41 raises/lowers the intermediate conveyor 14A to a discharge position (S43). When the intermediate conveyor 14A is raised/lowered to the discharge position, the processor 41 drives the intermediate conveyor 14A to discharge the piece of cargo 31 (S44).

When the piece of cargo 31 is discharged, the processor 41 determines whether the discharge of the cargo of the tier is completed (S45). When the processor 41 determines that the discharge of the cargo of the tier is not completed (S45, NO), the processor 41 returns to S33.

When it is determined that the discharge of the piece of cargo 31 of the tier is completed (S45, YES), the processor 41 ends the operation.

It should be noted that the processor 41 may not have to execute S33 in the case of gripping the first piece of cargo 31 from the same-type cargo group.

An operation example (S16) in which the processor 41 unloads the upper tier according to the second gripping method of gripping the piece of cargo 31 from the mixed-type cargo group will now be described.

Figure 8:
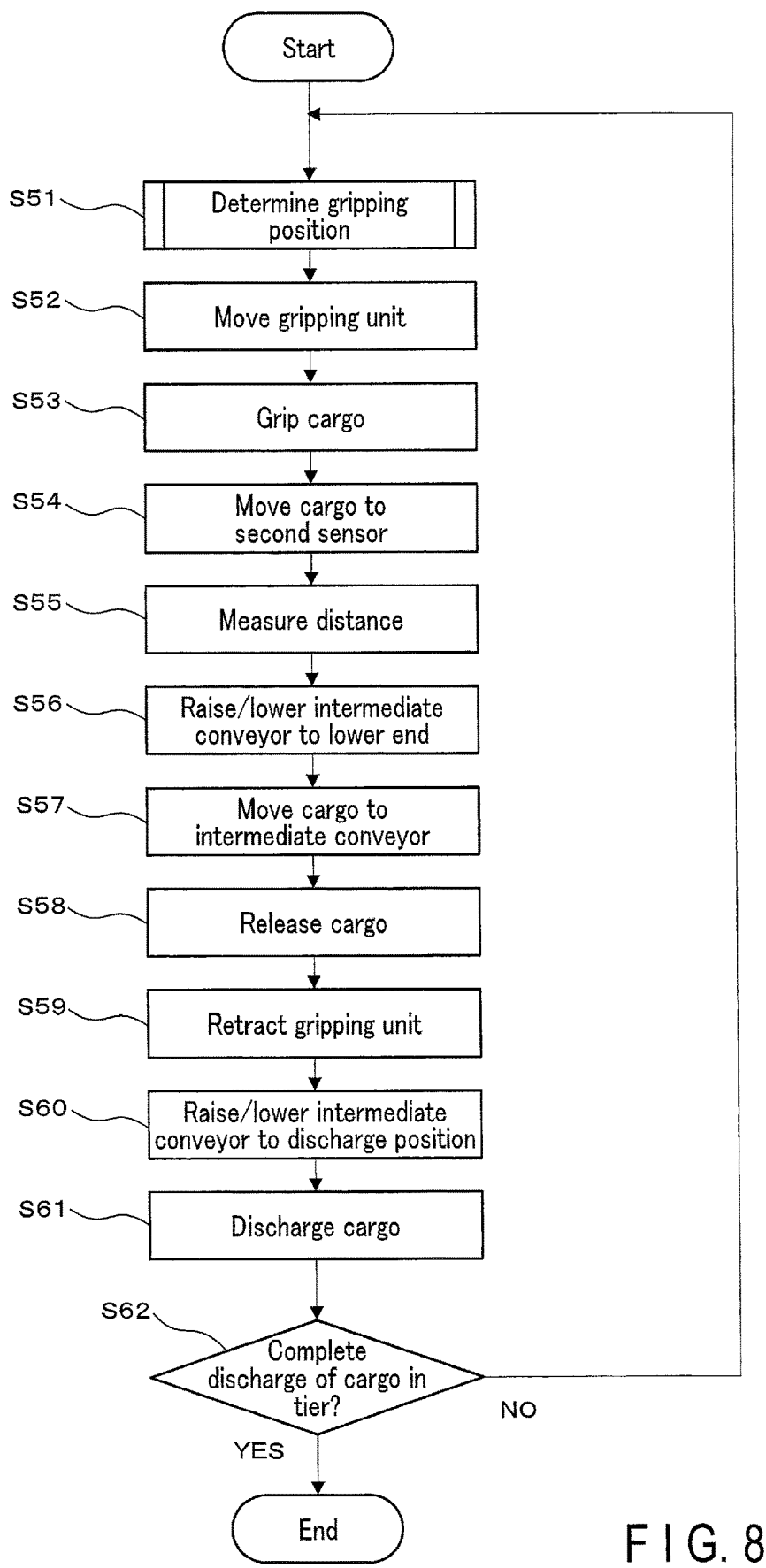
FIG. 8 is a flowchart for explaining an operation example of the unloading apparatus according to the embodiment.

FIG. 8 is a flowchart for explaining the operation example (S16) in which the processor 41 unloads the upper tier according to the second gripping method of gripping the piece of cargo 31 from the mixed-type cargo group.

First, the processor 41 determines a gripping position (S51). When the gripping position is determined, the processor 41 moves the gripping unit 12 to the piece of cargo 31 based on the gripping position (S52). After moving the gripping unit 12 to the piece of cargo 31, the processor 41 grips the piece of cargo 31 (S53).

When the piece of cargo 31 is gripped, the processor 41 moves the piece of cargo 31 to a position above the second sensor 16 (S54). When the piece of cargo 31 is moved to a position above the second sensor 16, the processor 41 measures the distance to the bottom surface of the piece of cargo 31 using the second sensor 16 (S55).

After measuring the distance to the bottom surface of the piece of cargo 31, the processor 41 raises/lowers the intermediate conveyor 14A to the lower end of the piece of cargo 31 based on the distance (S56). When the intermediate conveyor 14A is raised/lowered to the lower end of the piece of cargo 31 based on the distance, the processor 41 moves the piece of cargo 31 onto the intermediate conveyor 14A (S57).

When the piece of cargo 31 is moved onto the intermediate conveyor 14A, the processor 41 releases the piece of cargo 31 (S58). When the piece of cargo 31 is released, the processor 41 retracts the gripping unit 12 (S59).

When the gripping unit 12 is retracted, the processor 41 raises/lowers the intermediate conveyor 14A to a discharge position (S60). When the intermediate conveyor 14A is raised/lowered to the discharge position, the processor 41 drives the intermediate conveyor 14A to discharge the piece of cargo 31 (S61).

When the piece of cargo 31 is discharged, the processor 41 determines whether the discharge of the cargo of the tier is completed (S62). When the processor 41 determines that the discharge of the cargo of the tier is not completed (S62, NO), the processor 41 returns to S51.

When it is determined that the discharge of the piece of cargo 31 of the tier is completed (S62, YES), the processor 41 ends the operation.

It should be noted that the processor 41 may execute S54 and S55 in the case of gripping the first piece of cargo 31 from the mixed-type cargo group. In this case, the processor 41 may raise/lower the intermediate conveyor 14A to a predetermined height after S53.

An operation example (S51) in which the processor 41 determines the gripping position will now be described.

Figure 9:
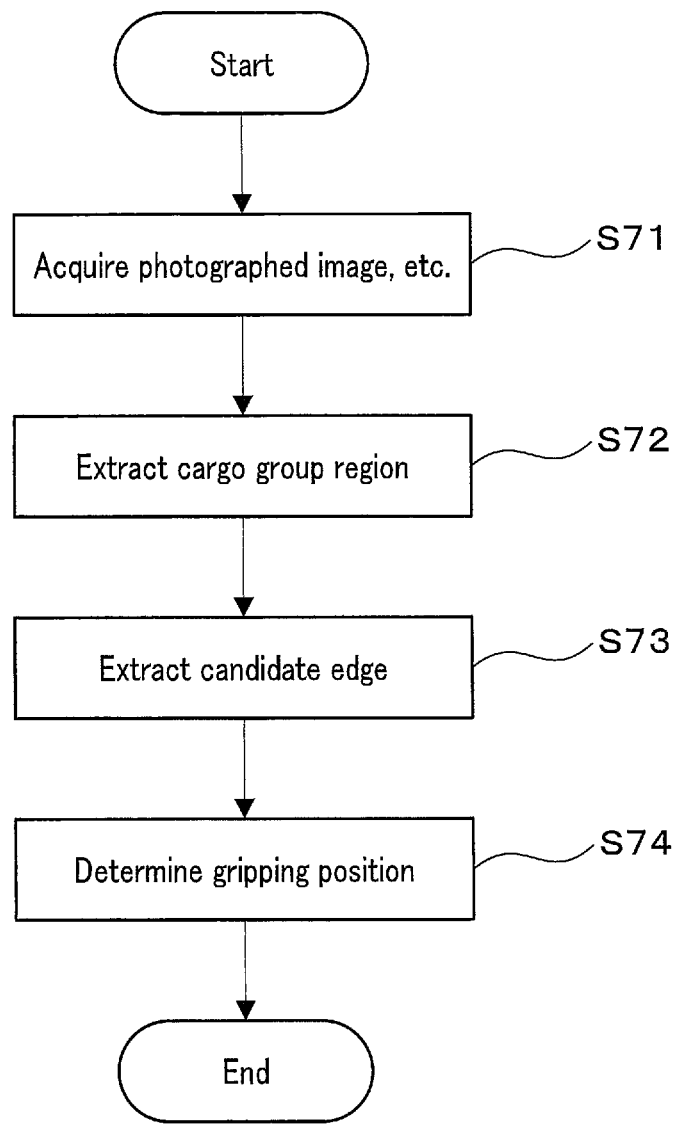
FIG. 9 is a flowchart for explaining an operation example of the unloading apparatus according to the embodiment.

FIG. 9 is a flowchart for explaining the operation example (S51) in which the processor 41 determines the gripping position.

First, the processor 41 acquires a photographed image and distance information using the first sensor 15 (S71). After acquiring the photographed image and the distance information, the processor 41 extracts a cargo group region from the photographed image (S72).

After extracting the cargo group region, the processor 41 extracts a candidate edge from the outer frame of the cargo group region (S73). After extracting the candidate edge, the processor 41 determines the gripping position based on the candidate edge (S74). When the gripping position is determined, the processor 41 ends the operation.

It should be noted that the unloading apparatus 10 may also include a sensor that acquires the photographed image and a sensor that acquires the distance information, instead of the first sensor 15.

In addition, the unloading apparatus 10 may include a plurality of sensors for acquiring the photographed image. The unloading apparatus 10 may also include a plurality of sensors for acquiring the distance information.

The unloading apparatus 10 may also include a plurality of arm units and a plurality of gripping units 12.

In the unloading apparatus configured in the manner described above, when unloading is performed from the upper tier of the cargo group, the cargo in the tier is recognized as the same-type cargo group. In the case where the recognition is successful, the unloading apparatus performs the unloading of the upper tier according to the first gripping method corresponding to the same-type cargo group.

In the case where the recognition has failed, the unloading apparatus unloads the upper tier according to the second gripping method corresponding to the mixed-type cargo group.

Therefore, the unloading apparatus can seamlessly perform unloading even in a case where the tier of the same-type cargo group and the tier of the mixed-type cargo group are mixed in the cargo group.

In addition, the unloading apparatus can perform unloading at a high speed by using the first gripping method in the case where the tier is the same-type cargo group.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the scope and spirit of the invention, and are also included in the invention described in the claims and the equivalent scope thereof.

The invention claimed is:

1. An unloading apparatus comprising:
a sensor interface that acquires a photographed image from a sensor that photographs an image of a cargo group;
a gripping unit interface that communicates with a gripping unit configured to grip a piece of cargo of the cargo group; and
a processor that:
recognizes, from the photographed image, each piece of cargo of a same-type cargo group including a same type of cargo,
transmits, in a case of successfully recognizing each piece of cargo of the same-type cargo group, a first control signal to the gripping unit through the gripping unit interface to perform unloading according to a first gripping method corresponding to the same-type cargo group, and
transmits, in a case of failing to recognize each piece of cargo of the same-type cargo group, a second control signal to the gripping unit through the gripping unit interface to perform unloading according to a second gripping method corresponding to a mixed-type cargo group including different types of cargo;
wherein, in a case of failing to recognize each piece of cargo of the same-type cargo group, the processor extracts from the photographed image a cargo group region in which a piece of cargo of an upper tier is captured, determines a gripping position based on the cargo group region, and transmits the second control signal to the gripping unit based on the gripping position;
wherein, in a case of successfully recognizing each piece of cargo of the same-type cargo group, as the first gripping method, the processor extracts a cargo region of each piece of cargo from the photographed image, formulates a gripping plan based on the cargo region, and transmits the first control signal to the gripping unit based on the gripping plan;
wherein, as the second gripping method, the processor extracts a candidate edge facing the gripping unit in a direction from the gripping unit to the cargo from an outer frame of the cargo group region, and determines the gripping position on the candidate edge;
wherein the first gripping method is a method of gripping a plurality of pieces of cargo; and
wherein the second gripping method is a method of gripping one piece of cargo.

2. The unloading apparatus according to claim 1, wherein the processor extracts from the photographed image a cargo group region in which a piece of cargo of an upper tier is captured, extracts a reference region corresponding to a predetermined reference image in the cargo group region, and extracts a cargo region of each piece of cargo of the same-type cargo group based on the reference region.

3. The unloading apparatus according to claim 1, wherein, when the number of pieces of cargo of the same-type cargo group is smaller than a predetermined threshold value, the processor transmits the second control signal to the gripping unit according to a second gripping method corresponding to a mixed-type cargo group.

4. The unloading apparatus according to claim 1, comprising:
the gripping unit;
an arm unit configured to move the gripping unit; and
the sensor.

5. The unloading apparatus according to claim 1, wherein the gripping unit includes a suction pad.

* * * * *